Patented Nov. 21, 1944

2,363,232

UNITED STATES PATENT OFFICE 2,363,232

PROCESSES OF AND COMPOSITIONS FOR PROTECTIVELY COATING FRESH FRUITS OR VEGETABLES

Charles De Witt Cothran, Pomona, Calif., assignor, by mesne assignments, to Brogdex Company, a corporation of California No Drawing. Original application September 13, 1934, Serial No. 743,924. Divided and this application September 8, 1941, Serial No. 410,099

12 Claims. (Cl. 99—168)

This invention relates to processes of and compositions for protectively coating fresh fruits or vegetables; and it relates more particularly to emulsions of waxy material prepared with the aid of an amine soap as the active emulsifying agent, and to the application of such emulsions in the preparation of fresh fruits or vegetables for market for the purpose of protectively coating the same in order to prevent or minimize withering or loss of plumpness and otherwise to enhance the marketability of such products. It is to be understood that the invention is not concerned with the cleansing of fruits or vegetables to remove dirt and other foreign matter therefrom. But such cleansing, which involves conditions of operation and the employment of materials quite different from those suitable for application of a waxy coating to fresh fruits and vegetables for protection against shrinkage and loss of weight in shipping them to market and distributing them to consumers, may and generally does precede the protective coating treatment with which the present invention is concerned.

The present application is a division of a copending application, Ser. No. 743,924, filed September 13, 1934, Patent No. 2,261,229; and, although claiming broadly the invention disclosed therein, it is directed more particularly to that species of said invention involving the use of protective coating emulsions which do not include as one of their components a free nonvolatile oil. It is sometimes desirable, or even necessary, in protectively wax-coating certain fruits or vegetables, to avoid the presence of such free oil component, this being so in treating avocados, for example.

During the last twenty years, extensive progress has been made in the matter of protectively treating fresh fruits especially, such as citrus fruits and apples for example, by providing the same with a protective coating of waxy material of such nature as materially to reduce the natural rate of withering or shrinkage normally undergone by untreated fruit, without at the same time adversely affecting the flavor and edibility of the fruit thus protectively coated. Consequently, providing fresh fruit with a waxy coating of this character while it is being packed for shipment from the producing sections has now become standard practice with a large proportion of commercial fruit packers and shippers and is generally recognized in the industry as highly advantageous.

Owing to the fact that the surface of fresh fruit to be marketed as such must not be sealed so completely as to interfere unduly with its so-called "breathing" or transpiration so essential to its remaining sound and edible, as well as to other considerations including extreme sensitiveness of fruit to mechanical injury and also to chemical or like injury by many substances that would otherwise be suitable for use in fruit coating operations, the problem of providing fresh fruit with a coating adequately protective and otherwise satisfactory in character was regarded for many years as quite impractical of solution, and it was finally worked out only after long and expensive research. In the form now most widely used commercially, the method resulting from that research involves the atomization of molten paraffin, usually containing a relatively small proportion of a considerably higher-melting and harder wax such as carnauba, into contact with fruit in a chamber heated to temperatures on the order of 180° to 220° F., wherein the fruit is also briskly rubbed with horsehair brushes or the like to spread the small quantity of molten wax deposited on each fruit thoroughly over the entire surface thereof in a firmly adherent lustrous film coating which is so extremely thin as to be virtually invisible but which is continuous or integral and effective to cut down the rate of withering or loss of moisture from the fruit to about 30 to 40 per cent of that normal for uncoated fruit. This reduction represents the approximate limit beyond which it is usually not safe to go in sealing the surface of the fruit.

The practical necessity for using heat in carrying out this method just mentioned, as well as for brushing the fruit and thus exposing it to possible surface injury during treatment, has prompted various proposals and attempts to substitute other coating materials and procedures alleged to be safer and less troublesome and expensive because not involving the use of heat or of brushing. Chief among these proposals has been that of applying coating materials of various kinds to the fruit in the form of an aqueous emulsion which could be sprayed upon the fruit or into which the fruit could be dipped, and which would not only maintain the fruit plump but would give it a higher luster or shine without rubbing or brushing. Although it would appear at first glance that such proposed procedures should attain the desired results without great difficulty, it was soon found that solving the problem in this manner was by no means simple, and that numerous difficulties and disadvantages of a practical nature were thus introduced which appeared to be virtually insuperable. Sometimes the fruit surface was adversely affected in one way or another by the particular coating material proposed, or was inadequately protected thereby, with the result that, notwithstanding initial soundness and good appearance, the fruit collapsed in a comparatively short time. In other cases, the appearance or feel of the coating was so objectionable as to render the fruit uncommercial and therefore worthless.

According to the present invention, fresh fruits and vegetables, such as oranges, lemons, grapefruit, tangerines, melons (e. g. cantaloups), avocados, tomatoes, limes, bananes, etc., intended to be marketed in fresh condition, can be effectively protected against withering and shrinkage to the desired extent, while also insuring their satisfactory surface appearance, by applying thereto in the packing house a suitable wax-containing emulsion prepared with the aid of an amine soap as the principal or exclusive emulsifying agent. The operating temperatures need not be above ordinary summer room temperature (e. g. 75–85° F.) and brushing or rubbing of the fruit to finish the protective coating is not essential; although the application of moderate heat and/or brushing is permissible and in some cases may be desirable for attaining best results. The amine soap employed as emulsifying agent may vary widely in specific description; but those best adapted for use in the practice of the present invention are prepared by reaction between an ethanolamine, more especially triethanolamine (commercial), with a free fatty acid such as oleic, stearic, palmitic, or linoleic acid. The term "wax" as herein employed is used broadly to designate not only true waxes in the commercial sense, but also any other materials of waxy or wax-like nature which are effective as sealing agents to the desired extent when distributed very thinly over the surface of fruits or vegetables to form an adherent, semi-permeable coating of sufficient flexibility, and which are non-injurious thereto, unobjectionable from the standpoint of appearance, and non-toxic to humans. In order that the finished coating shall adhere perfectly and shall also possess other physical characteristics requisite for the purposes in view, it is desirable that the wax component of the emulsion consist, at least in large part, of a fairly soft and low-melting wax. Paraffin answers these requirements admirably and is typical of wax materials suitable in this respect. However, the incorporation of a harder and higher-melting wax, such as carnauba, as a part of the wax component, is often highly advantageous, especially in respect to enhancing the gloss or shine of the finished coating. Examples of other waxes or waxy materials suitable for use in practicing the invention either when used alone or in admixture with another wax, with or without the addition of other suitable substances to form a coating composition, are ceresin, ozokerite and japan wax, which resemble paraffin in being relatively soft and low-melting; and candelilla, palm, china and montan waxes, which, like carnauba, are relatively hard and high-melting. In commercial practice, paraffin is most suitable as the principal wax component of the emulsion where it is important to obtain the maximum permissible retardation of shrinkage or withering; and where a harder and higher-melting wax is to be associated therewith in order to give the finished coating greater luster or shine than characterizes the use of paraffin alone, carnauba wax is very satisfactory for the purpose.

One of the prime requirements of a satisfactory protective waxy coating for fresh fruit is that the coating, although it must not be sufficiently thick to completely seal the surface of the fruit and entirely stop transpiration, shall nevertheless be continuous over the entire surface of the fruit. A coating which consists merely of separate or discrete fine granules or particles of the coating material, not united or blended together in some way to form a substantially continuous integral film envelope, is ordinarily insufficient for the purpose in view both because it fails to give the proper partial sealing effect necessary to hold the fruit plump and unwithered throughout the normal marketing period, and also because such a coating does not present the desired luster or shine required by the trade. Where fruit is properly rubbed or brushed upon or after application of the waxy material thereto, such blending or unifying of the waxy particles to form a continuous or integral protective film can be effected under suitable operating conditions. But, since emulsification of a wax inherently involves maintaining the wax particles separate and unblended, the problem of obtaining a sufficiently integral or continuous protective film coating merely by dipping the fruit into an emulsion or spraying it therewith, without rubbing the fruit, has presented difficulties not satisfactorily overcome heretofore. The present applicant has found, however, that by the use of a wax-containing emulsion produced with the aid of a soap or triethanolamine or similar amine, the aforesaid highly important result can be attained. When such an amine emulsifying agent is employed, the condition of the paraffin or other wax in the emulsion is such that application of the emulsion in proper fluidity to the fruit merely by dipping or spraying, and allowing the excess of emulsion to drain off, suffices to produce a protective coating that is satisfactory as a rule, particularly so in the case of fruits that are not required by the trade to exhibit high surface luster or polish. The protection afforded against withering or shrinkage by the coating thus applied is ordinarily sufficient for practical purposes. Furthermore, by employing certain specific emulsions hereinafter to be referred to, it is also possible in the practice of the invention to obtain coatings of relatively high gloss or shine as well as good protective properties, without having to resort to rubbing or brushing.

A very important feature of the invention resides in the fact that by the use of an amine soap as described, it is possible to obtain a given degree of shrinkage retardation in fresh fruit by applying an aqueous emulsion containing a substantially lower percentage of wax component than has heretofore been essential in the use of emulsions for this purpose. It thus becomes possible to employ emulsions which produce sufficiently protective coatings but which are nevertheless highly fluid so that any excess applied to the fruit drains off quickly and evenly, leaving an extremely small quantity of the emulsion distributed uniformly over the surface of the fruit. This permits rapid drying to occur, with eventual production of an extremely thin film coating of waxy material which adheres firmly to the surface of the fruit and which, as already pointed out, also has the protective properties of a virtually continuous or integral coating. Heretofore, in order to produce emulsion dip or spray coatings adequate from the standpoint of retarding shrinkage or withering, it was necessary that the emulsion contain a much larger percentage of wax, or that other substances be added having more positive and complete sealing effect upon the fruit surfaces; but this led to other difficulties and objections so fundamental as to render the use of such emulsions impractical and sometimes even positively injurious to the fruit.

In an aqueous emulsion as actually applied to the fruit in practicing the present invention, waxy material need never be present in proportion greater than 10 per cent by weight of the emulsion; and, in the best embodiments of the invention, the content of waxy material does not exceed 5 or 6 per cent as a practical maximum. A waxy content of around 4 to 5 per cent is especially recommended in practice, since this gives excellent retardation or shrinkage and enables the use of an emulsion of such thin consistency or fluidity that the finished coating resulting from application by dipping or spraying is also satisfactory from an appearance standpoint. For some purposes, especially where the fruit is certain to reach the ultimate consumer from the producing sections in a relatively short time, thus requiring less protection against withering, the waxy content of emulsions employed in accordance with the invention may be as low as 1½ or 2 per cent.

It has also been found that the proper proportioning of the amine compound and the free fatty acid employed to produce the amine soap emulsifying agent is a matter of great importance. While it is possible to obtain useful results in practicing the invention when the amine and the free fatty acid are employed substantially in the reacting proportions theoretically required to produce a neutral soap, that is, in chemically equivalent proportions, the further surprising discovery has been made that materially better results are attained when the amine is used in substantial excess. Thus, when employing commercial triethanolamine with oleic, stearic, or linoleic acid, it is desirable to employ substantially equal parts by weight of the amine and the free fatty acid. Commercial triethanolamine consists of about 75 per cent pure triethanolamine, the remaining 25 per cent consisting largely of diethanolamine and a similar proportion of monoethanolamine. For production of a neutral soap, one part of the commercial triethanolamine would be mixed with a much larger amount, around 2 to 3 parts by weight of the free fatty acid, depending upon the specific identity of the latter. It will therefore be seen that in the best embodiments of the present invention, a substantial excess of the amine is used, this excess being in some cases desirably much greater even than is attained by using equal parts of the amine and free fatty acid. In fact, the use of as much as one and one-half parts by weight of amine to one part free fatty acid has been found advantageous in some instances. This use of an excess of the amine renders the emulsion slightly alkaline and, under the conditions herein set forth, improves its character in various respects as a coating material for fruits and vegetables. However, the total amount of the amine compound employed in the emulsion need not be large. Ordinarily the proportion of the amine soap present need not exceed a maximum of about 4 or 5 per cent by weight, and 1 to 2 per cent is to be particularly recommended in practice. By "amine soap" is here meant the total quantity of amine and free fatty acid employed in making up the emulsion, regardless of whether, if an excess of the amine is used, such excess exists in the free state or in combination with the fatty acid as a non-neutral (alkaline) soap.

Of the various fatty acids available for use in the practice of the invention, oleic acid is especially desirable because of the fact that the soaps which it forms with amines have the property, in addition to their excellent dispersing action upon waxy material in aqueous emulsions, of materially enhancing the flexibility and toughness or resistance of the finished film coating. This is important because of the varying pressure, chafing, etc. which fresh fruit unavoidably undergoes in its commercial transportation and handling incidental to its distribution to consumers. This desirable property also characterizes amine soaps of stearic acid and linoleic acid, but in other respects they are not so suitable ordinarily. Linoleic acid soaps, for example, are usually not free from odor, which is often a disadvantage. Practical considerations of this nature therefore serve as a guide to the selection of the most suitable fatty acid to employ, and the choice is obviously not confined to the fatty acids specifically mentioned herein by way of illustration.

Without intending to limit the invention to specific details of emulsion composition or specific steps of applying emulsions of fresh fruit or vegetables for protectively coating the same, a number of specific examples illustrating practical embodiments of the invention will now be given for the sake of further explaining the underlying principles involved. In these examples, the proportioning of the emulsion ingredients is given in parts by weight.

Example 1

An aqueous emulsion found to be effective for protectively coating fresh fruits and vegetables generally consists of four parts of a good commercial grade of paraffin wax emulsified with the aid of one part each of oleic acid and triethanolamine, the remainder (94 parts) being water. Such an emulsion has excellent fluidity and can therefore be applied to the fruit or vegetable to be coated by dipping or spraying, any excess rapidly draining from the fruit. After drying, the finished coating left on the treated vegetable product or article (i. e. fruit or vegetable) is so extremely thin as to be practically invisible. Nevertheless it is substantially continuous and integral, adheres well to the surface of the article and affords a high degree of protection against withering and shrinkage as well as against surface infection by entry of decay spores or the like from external sources. Vegetable products thus coated remain commercially plump and attractive for periods of time far longer than do the same products when not coated, and their flavor and freshness remain unimpaired.

In general, it is satisfactory to apply the emulsion at ordinary room temperatures in the vicinity of 75° to 85° F. There is some practical advantage, however, in operating with the emulsion warmed to about 110° to 115° F., because under these conditions the fluidity of the emulsion is somewhat greater, penetration of the emulsion into surface porosities is enhanced, and the subsequent drying of the coated article is more rapid. Moderate heating of the emulsion is therefore usually to be recommended as better practice.

In preparing emulsions of the type just referred to, the amine emulsifying agent, in this instance triethanolamine, is added to the necessary amount of water which has been previously heated to a temperature of about 160° F. The resultant solution is run into an agitating tank and agitation started. The paraffin and oleic acid are separately heated together to form a fluid mixture having a temperature of from 160° to 180° F., and this mixture is gradually run into the hot solution of triethanolamine while continuing the agitation. It is feasible to reverse this operation, that is, to run the water solution of triethanolamine into the hot fluid mixture containing the wax; but the procedure first described is found to yield a final emulsion of more thoroughly satisfactory character and is therefore especially to be recommended. After the agitation has been continued for five to fifteen minutes, emulsification is most desirably further perfected by running the mixture through a colloid mill, whereupon the emulsion is ready for application to the fruit in the manner already described, or in any other suitable way.

Example 2

By replacing a part of the paraffin employed in Example 1 with a much harder and higher-melting wax, such as carnauba, the final coating obtained on the vegetable product treated shows a higher luster or shine and is therefore better suited for use in protectively coating fruit, such as oranges and tangerines for example, that should be given a high surface gloss or shine in order to satisfy the requirements of the trade in the large marketing centers. The proportion of the harder and higher-melting wax thus incorporated with the paraffin may vary considerably, but it is ordinarily inadvisable for it to constitute more than about 25 per cent of the total wax component of the emulsion because larger proportions, although not excluded, are apt to render the final coating too brittle and insufficiently adherent to the fruit surface. Where the harder wax constitutes in the neighborhood of 10 to 15 per cent of the total wax component, satisfactory results are usually obtained, 10 per cent being an optimum proportion in the case of carnauba wax, for example.

Example 3

In this instance the emulsion contains 5 parts of paraffin emulsified with the aid of 5 parts of stearic acid and 2.5 parts of triethanolamine, the remaining 87.5 parts being water. The emulsion may be prepared in the same general manner as is described in Example 1. This emulsion is somewhat less alkaline in reaction than those of the preceding examples, and the larger percentages of triethanolamine and stearic acid employed render it somewhat less freely fluid at ordinary room temperatures.

Example 4

An emulsion that is very useful, where rather heavier protective coatings are desired that will still meet the requirement of not unduly checking breathing or transpiration, may be prepared by emulsifying 7.5 parts of paraffin with water, using 1 part of oleic acid and 1 part of triethanolamine as the emulsifying agent, the final emulsion containing 90.5 parts of water.

The presence of a very large proportion of carnauba wax, referred to in Example 2 as permissible, causes lack of gloss on the treated fruit unless it be subjected to a polishing operation, due to the fact that the carnauba solidifies in minute crystalline particles. The polish of the finished fruit may be increased to a very satisfactory degree by a rubbing or polishing operation and such an operation likewise increases the prevention of shrinkage of the fruit in storage, the shrinkage being somewhat less if there is a polishing operation.

While the foregoing examples illustrate practical specific embodiments of the invention, it is to be understood that the invention is in no sense restricted thereto but is of broader scope as hereinabove explained and as pointed out in the appended claims. Within the scope of the broad invention, it is accordingly permissible and frequently desirable to include in the emulsion, in addition to the waxy material, a free oil such as a white mineral oil (e. g. medicinal oil) or other non-volatile mineral oil free of objectionable taste, odor or color; such free oil being employed in proportion smaller than, most desirably less than half, that of the waxy material. Thus, the emulsion formula of Example 1 may include 1 part of a white mineral oil, which may be heated with the paraffin wax and oleic acid in preparing the emulsion in the manner described, a corresponding slightly smaller proportion of water being employed to make the emulsion up to 100 parts. Similarly 1 part of white mineral oil may be used in the emulsions of Examples 2 and 4, and 2.5 parts in that of Example 3. Such oil-containing emulsions, as well as the protective treatment of fresh fruits and vegetables therewith, are specifically claimed in copending application Ser. No. 743,924 aforesaid.

It is vitally important for the purposes of the invention that the waxy coating produced and remaining on the given fruit or vegetable for retarding withering or shrinkage thereof shall contain no component that acts injuriously upon it or otherwise adversely affects its marketability as, for example, by giving it an objectionable odor or appearance. Hence, practice of the invention excludes employing emulsions containing such components. For example, strong or caustic alkali-metal bases in free condition, ordinary kerosene, and many other substances sometimes used in cleansing dirty fruit to facilitate removal of foreign matter therefrom, would be highly detrimental and should be avoided as components of a waxy coating intended to protect fruit and vegetables against withering and shrinkage in accordance with the principles of the invention.

What is claimed is:

1. A thinly fluid aqueous emulsion useful for protectively coating fresh fruits or vegetables against withering or shrinkage, which comprises 1 to 10 parts of waxy material emulsified with less than 5 parts of an amine soap, together with water sufficient to make 100 parts, all parts being by weight; said emulsion comprising substantially no free oil, and being free of components injurious to fruits and vegetables or otherwise adversely affecting marketability thereof.

2. A thinly fluid aqueous emulsion useful for protectively coating fresh fruits or vegetables against withering or shrinkage, which comprises 1 to 10 parts of a mixture of paraffin wax and a higher-melting wax emulsified with less than 5 parts of an amine soap, together with water sufficient to make 100 parts, all parts being by weight; said emulsion comprising substantially no free oil, and being free of components injurious to fruits and vegetables or otherwise adversely affecting marketability thereof.

3. A thinly fluid aqueous emulsion useful for protectively coating fresh fruits or vegetables against withering or shrinkage, which comprises 1 to 10 parts of a mixture of paraffin wax and carnauba wax emulsified with less than 5 parts of an amine soap, together with water sufficient to make 100 parts, all parts being by weight; said emulsion comprising substantially no free oil, and being free of components injurious to fruits and vegetables or otherwise adversely affecting marketability thereof.

4. An aqueous emulsion useful for protectively coating fresh fruits or vegetables against withering or shrinkage, which comprises 1 to 5 parts of waxy material emulsified with not to exceed about 2 parts of an ethanolamine soap, together with water to make 100 parts, all parts being by weight; said emulsion comprising substantially no free oil, and being free of components injurious to fruits and vegetables or otherwise adversely affecting marketability thereof.

5. An aqueous emulsion useful for protectively coating fresh fruits or vegetables against withering and shrinkage and having approximately the following composition, all parts being by weight: 4 to 5 parts of waxy material, mainly paraffin; the product of reaction between substantially equal parts (0.5 to 1.5 parts each) of triethanolamine and oleic acid; and water sufficient to make 100 parts; said emulsion comprising substantially no free oil, and being free of components injurious to fruits and vegetables or otherwise adversely affecting marketability thereof.

6. A thinly fluid aqueous emulsion useful for protectively coating fresh fruits and vegetables against withering or shrinkage, which comprises 1 to 10 parts of waxy material emulsified with the aid of less than 5 parts of a soap resulting from reaction between triethanolamine and a fatty acid, together with water sufficient to make 100 parts, all parts being by weight; said emulsion being free of components injurious to fruits and vegetables or otherwise adversely affecting marketability thereof.

7. The process of treating fresh fruits or vegetables in preparation for market to protect the same against withering or shrinkage, which comprises distributing uniformly over the surface of each such article a small quantity of an aqueous emulsion of the character defined in claim 1, and permitting the article to dry.

8. The process of treating fresh fruits or vegetables in preparation for market to protect the same against withering or shrinkage, which comprises distributing uniformly over the surface of each such article a small quantity of an aqueous emulsion of the character defined in claim 2, and permitting the article to dry.

9. The process of treating fresh fruits or vegetables in preparation for market to protect the same against withering or shrinkage, which comprises distributing uniformly over the surface of each such article a small quantity of an aqueous emulsion of the character defined in claim 3, and permitting the article to dry.

10. The process of treating fresh fruits or vegetables in preparation for market to protect the same against withering or shrinkage, which comprises distributing uniformly over the surface of each such article a small quantity of an aqueous emulsion of the character defined in claim 4, and permitting the article to dry.

11. The process of treating fresh fruits or vegetables in preparation for market to protect the same against withering or shrinkage, which comprises distributing uniformly over the surface of each such article a small quantity of an aqueous emulsion of the character defined in claim 5, and permitting the article to dry.

12. The process of treating fresh fruits or vegetables in preparation for market to protect the same against withering or shrinkage, which comprises distributing uniformly over the surface of each such article a small quantity of an aqueous emulsion of the character defined in claim 6, and permitting the article to dry.

CHARLES DE WITT COTHRAN.